(12) United States Patent
Wilkens et al.

(10) Patent No.: US 12,722,776 B2
(45) Date of Patent: Sep. 1, 2026

(54) AIRPLANE FLY-BY-WIRE CONTROL SYSTEM AND METHOD

(71) Applicant: Kaney Aerospace, Inc., Rockford, IL (US)

(72) Inventors: Dean Wilkens, Scottsdale, AZ (US); Waleed M. Said, Rockford, IL (US)

(73) Assignee: Kaney Aerospace, LLC, Rockford, IL (US)

( * ) Notice: Subject to any disclaimer, the term of this patent is extended or adjusted under 35 U.S.C. 154(b) by 0 days.

(21) Appl. No.: 19/251,415

(22) Filed: Jun. 26, 2025

(65) Prior Publication Data

US 2026/0001642 A1 Jan. 1, 2026

Related U.S. Application Data

(60) Provisional application No. 63/665,780, filed on Jun. 28, 2024.

(51) Int. Cl.
*B64C 13/50* (2006.01)

(52) U.S. Cl.
CPC .................................. *B64C 13/503* (2013.01)

(58) Field of Classification Search
None
See application file for complete search history.

(56) References Cited

U.S. PATENT DOCUMENTS 4,443,853 A * 4/1984 Maciolek .............. B64C 13/503 244/180
6,443,399 B1 9/2002 Yount et al.
6,573,672 B2 6/2003 O'Rourke et al.
7,182,296 B2 2/2007 Yount et al.
7,840,316 B2 11/2010 Yount et al.
7,878,461 B2 2/2011 Hirvonen et al.
7,984,878 B2 7/2011 Hirvonen
8,084,972 B2 12/2011 Strong et al.
8,104,720 B2 1/2012 Hirvonen et al.
8,235,328 B2 8/2012 Hirvonen
8,789,791 B2 7/2014 Matasso et al.
(Continued)

FOREIGN PATENT DOCUMENTS

DE 102005008556 A1 8/2006
EP 2505497 A1 10/2012
(Continued)

*Primary Examiner* — Tye William Abell
(74) *Attorney, Agent, or Firm* — Amundsen Davis, LLC

(57) ABSTRACT

Fly-by-wire (FBW) control systems and methods for an aircraft are disclosed herein. In one example embodiment, the present disclosure relates to a FBW control system for an aircraft including a plurality of inceptors, a plurality of actuators, a plurality of linkages, at least one controller area network (CAN) bus, and at least one flight control computer (FCC) coupled to the plurality of actuators by the at least one bus. Each of the linkages respectively electrically couples a respective pair of the inceptors and actuators. Further, the at least one FCC is coupled to the inceptors only indirectly by the plurality of linkages and the at least one bus, with the plurality of actuators being coupled between the at least one bus and the plurality of linkages. Additionally, in at least one additional example embodiment, the present disclosure relates to an electric power distribution system for an aircraft.

20 Claims, 7 Drawing Sheets

(56) References Cited

U.S. PATENT DOCUMENTS 8,866,422 B2 10/2014 Nakagawa et al.
8,935,015 B2 1/2015 Olsoe et al.
9,081,372 B2 7/2015 Fervel et al.
9,327,825 B2 5/2016 White et al.
9,540,096 B2 1/2017 Lin et al.
9,819,179 B2 11/2017 Nakagawa et al.
10,193,349 B2 1/2019 Yasui
10,338,560 B2 7/2019 Liu et al.
10,382,225 B2 8/2019 Dormiani et al.
10,864,981 B2 12/2020 Cadotte et al.
11,097,834 B2 8/2021 Wilkens
11,155,341 B2 10/2021 Wilkens
11,273,906 B2 3/2022 Keir
11,479,344 B2 10/2022 Richter et al.
11,724,797 B2 8/2023 Richter et al.
11,820,492 B1 11/2023 Shaw
11,952,108 B2 4/2024 Gonzalo et al.
12,208,883 B2 1/2025 Gonzalo et al.
12,246,823 B2 3/2025 Shaw
12,252,236 B2 3/2025 Capelle et al.
2002/0161488 A1 10/2002 Guillemin et al.
2014/0303812 A1 10/2014 Avritch et al.
2019/0263533 A1 8/2019 Nierlich et al.
2022/0033066 A1* 2/2022 Rey ....................... B64C 13/503
2022/0227483 A1* 7/2022 Scanlan .................. B64C 13/50
2022/0269291 A1 8/2022 Teles Ferreira et al.
2023/0322366 A1* 10/2023 De Castro Paiva ... G05D 1/102 701/3
2024/0126259 A1 4/2024 Juhrig et al.
2024/0239477 A1* 7/2024 Shaw .................... B64C 13/503
2024/0308648 A1 9/2024 Dange et al.
2024/0409203 A1 12/2024 Eddy et al.
2025/0219556 A1* 7/2025 Hanus ...................... G05B 9/03

FOREIGN PATENT DOCUMENTS

EP 3563527 B1 3/2022
WO 2024/152015 A9 7/2024

* cited by examiner

AIRPLANE FLY-BY-WIRE CONTROL SYSTEM AND METHOD

CROSS-REFERENCE TO RELATED APPLICATIONS

The present application claims the benefit of, and priority to, U.S. provisional patent application No. 63/665,780 filed on Jun. 28, 2024 and entitled "IMPROVED AIRPLANE FLY-BY-WIRE CONTROL SYSTEM AND METHOD", which is hereby incorporated by reference herein.

FIELD

The present disclosure relates to control systems and methods for aircraft and aircraft employing such control systems and methods and, more particularly to fly-by-wire (FBW) control systems and methods for aircraft and aircraft employing such FBW control systems and methods.

BACKGROUND

Conventional fly-by-wire (FBW) systems certified on commercial aircraft generally always connect the pilot inceptor sensors to FBW computers which can then digitize the analog position signals and send the inceptor position data to processing elements or other computers that operate in accordance with (or perform) various control modes of operation, such as Normal, Alternate (Secondary), and Direct Modes. When the FBW computers are operating in each of these various control modes, the FBW computers produce surface actuator position commands. The surface actuator position commands are then consolidated in some manner and transmitted to actuator control loops, which perform actuation loop closure. In some applications the actuator loop closure circuitry is contained in the FBW computers and in some applications the actuator loop closure circuitry associated with any given actuator is packaged in a small unit mounted close to that actuator called a Remote Electronic Unit (REU).

Notwithstanding the prevalence of such conventional FBW systems, such systems can be disadvantageous in various respects. For example, such conventional FBW systems can be complicated and costly to implement. For at least one or more of these reasons, or one or more other reasons, it would therefore be advantageous if improved aircraft control systems and methods, and more particularly improved FBW aircraft control systems and methods, could be developed, so as to address any one or more of the concerns discussed above or to address one or more other concerns or provide one or more benefits.

BRIEF SUMMARY

In at least some example embodiments, the present disclosure relates to improved airplane fly-by-wire control systems and/or methods and/or related power distribution systems and/or methods. Further, in at least some such example embodiments, the improved control systems and/or power distribution systems include one or more of the following example architectures, systems/subsystems, capabilities, and/or related methods:

A. Direct Mode Architecture—Direct Connection of Inceptors to Actuators, Stick to Surface Control as Backup Without Flight Control Computers (FCCs);

B. Normal Mode—Indirect Connection of FCCs to Inceptors via Actuators

C. Dual Lane Command/Command (COM/COM) Actuator Architecture—Fault Tolerant Actuation Controller Employing Pulse Width Modulation (PWM) Command Summing for Trapezoidal Commutation;

D. Overall Flight Control System (FCS) Architecture—Dual Lane FCCs, Wrap Back Monitor, Dual Controller Area Network (CAN) Buses; and/or E. Electrical Architecture for FBW System.

Further in at least one example embodiment encompassed herein, the present disclosure relates to a fly-by-wire (FBW) control system for an aircraft, the control system being configured to provide a direct mode of operation and also a normal mode of operation. The FBW control system includes a plurality of inceptors, a plurality of actuators, a plurality of first linkages, and a first flight control computer (FCC) coupled to the actuators by at least one further linkage. Also, each of the inceptors is electrically coupled to a respective one or more of the actuators by a respective one or more of the first linkages, so that each of the first linkages respectively electrically couples a respective pair of the inceptors and actuators. Additionally, the first FCC is coupled to at least one of the inceptors only indirectly by at least one of the actuators and the at least one further linkage. During the normal mode of operation, the actuators of the plurality of actuators are actuated in response to control signals provided by the first FCC received via the at least one further linkage. Also, during the direct mode of operation, the actuators of the plurality of actuators are actuated in response to inceptor signals generated by the inceptors that are communicated directly by the first linkages from the inceptors to the actuators.

Additionally in at least one example embodiment encompassed herein, the present disclosure relates to a FBW control system for an aircraft including a plurality of inceptors, a plurality of actuators, a plurality of first linkages, at least one controller area network (CAN) bus, and at least one flight control computer (FCC) coupled to the plurality of actuators by the at least one CAN bus. Each of the inceptors is electrically coupled to a respective one or more of the actuators by a respective one or more of the first linkages, so that each of the first linkages respectively electrically couples a respective pair of the inceptors and actuators. Further, the at least one FCC is coupled to the inceptors only indirectly by the plurality of first linkages and the at least one CAN bus, with the plurality of actuators being coupled between the at least one CAN bus and the plurality of first linkages.

Also, in at least one example embodiment encompassed herein, the present disclosure relates to a method of operating an aircraft by a FBW control system of the aircraft. The method includes providing the aircraft with the FBW control system, where the FBW control system includes a plurality of inceptors, a plurality of actuators, a plurality of first linkages, at least one flight control computer (FCC), and at least one additional linkage. Each of the inceptors is electrically coupled to a respective one or more of the actuators by a respective one or more of the first linkages, so that each of the first linkages respectively electrically couples a respective pair of the inceptors and actuators, and the at least one FCC is coupled only indirectly to one or more of the inceptors, by each of the at least one additional linkage, at least one of the first linkages, and at least one of the actuators. The method additionally includes switching from a normal mode of operation to a direct mode of operation. During the normal mode of operation, a first one of the actuators is controlled at least in part based upon control signals provided by the at least one FCC. Also, during the direct mode of operation, the first one of the actuators is controlled exclusively based upon one or more of a plurality of inceptor signals generated by the inceptors that is or are communicated directly by one or more of the first linkages to the first one of the actuators.

Further in at least one example embodiment encompassed herein, the present disclosure relates to an electric power system for an aircraft. The electric power system includes a first power distribution unit (PDU) having a first bus, a second PDU having a second bus, and a plurality of power sources including a permanent magnet generator (PMG) and an electric battery, where the first bus of the first PDU is coupled at least indirectly to the PMG and the second bus of the second PDU is coupled at least indirectly to the electric battery. Also, the electric power system includes a plurality of solid state power controllers (SSPCs) by which the first bus of the first PDU is at least indirectly coupled to each of a first flight control computer (FCC), a plurality of actuators, and the PMG, and the second bus of the second PDU is at least indirectly coupled to each of a second FCC, the plurality of actuators, and the electric battery.

Additionally in at least one example embodiment encompassed herein, the present disclosure relates to an aircraft including a control system and an electric power distribution system. The control system includes a plurality of inceptors, a plurality of actuators, a plurality of first linkages, at least one controller area network (CAN) bus, and at least one flight control computer (FCC) coupled to the plurality of actuators by the at least one CAN bus. Each of the inceptors is electrically coupled to a respective one or more of the actuators by a respective one or more of the first linkages, so that each of the first linkages respectively electrically couples a respective pair of the inceptors and actuators. Further, the electric power distribution system includes a first power distribution unit (PDU) having a first bus, a second PDU having a second bus, and a plurality of power sources including a first power source of a first type and a second power source of a second type that is different from the first type. Also, the first bus of the first PDU is coupled at least indirectly to the first power source and the second bus of the second PDU is coupled at least indirectly to the second power source. Additionally, the electric power distribution system is configured so as to supply power to each of the at least one FCC and each the actuators.

Also, in at least one example embodiment encompassed herein, the present disclosure relates to a method of distributing electric power within an aircraft having a plurality of actuators configured to govern movements of control surfaces of the aircraft. The method includes providing an electric power distribution system having a first power distribution unit (PDU) having a first bus, a second PDU having a second bus, and a plurality of power sources including a permanent magnet generator (PMG) and an electric battery, where the first bus of the first PDU is coupled at least indirectly to the PMG and the second bus of the second PDU is coupled at least indirectly to the electric battery. Additionally, the method includes distributing at least some of the electric power either from the PMG via the first bus and a first plurality of solid state power controllers (SSPCs) to a plurality of actuators and to a first flight control computer (FCC), or from the electric battery via the second bus and a second plurality of SSPCs to the plurality of actuators and to either the first FCC or a second FCC.

Further, in at least some embodiments, the present disclosure relates to a power distribution system (or architecture) that enables bi-directional power flow, to enable regenerative energy to flow from the FBW actuators to the electrical system energy storage system. Additionally, in at least some such embodiments, the energy storage system includes a battery system coupled with a bank of capacitors, which in at least some such embodiments are super capacitors.

DETAILED DESCRIPTION

The present inventors have recognized the disadvantages associated with conventional aircraft control systems such as those described above, and further recognized that improved aircraft control system arrangements can be achieved that are advantageous in one or more respects relative to such conventional systems.

With these and other considerations in mind, the present inventors have further recognized that improved aircraft control systems can be realized in least some embodiments or circumstances, if the conventional signal flow concept of conventional aircraft control system designs is reversed. That is, the present inventors have recognized that, in at least some embodiments or circumstances, improved aircraft control systems can be achieved if the aircraft control systems are implemented in a manner in which inceptor position sensors are connected directly to the actuator loop closure circuitry which is packaged as part of the electromechanical actuators. Additionally, the present inventors have recognized that additional improved aircraft control systems can be achieved by implementing one or more additional features, such as one or more of those described below.

Figure 1:
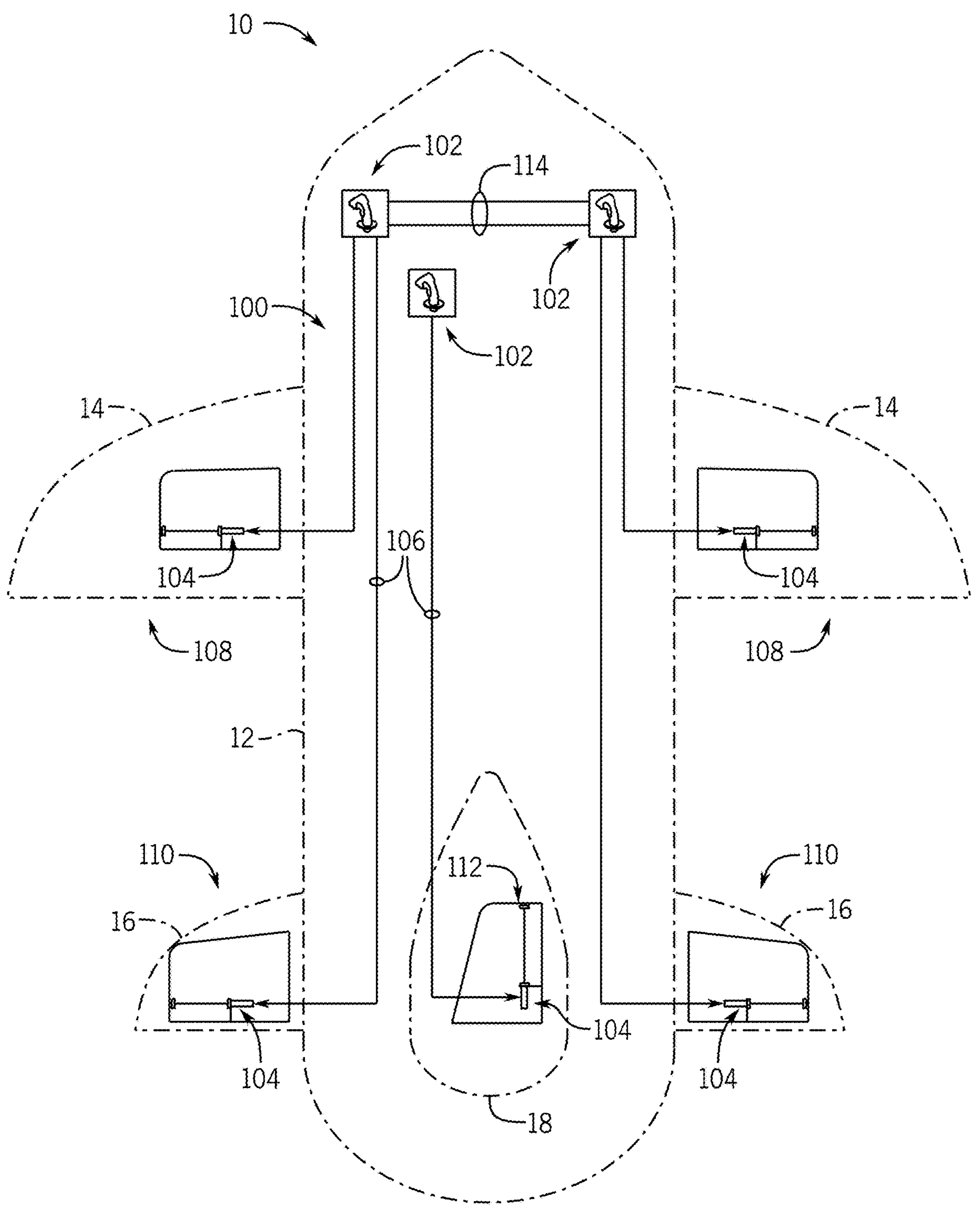
FIG. 1 is a schematic illustration of an example Direct mode control system architecture in accordance with an embodiment encompassed herein.

A. Direct Mode—Direct Connection of Inceptors to Actuators, Stick to Surface Control as Backup Without FCCs FIG. 1 illustrates schematically a Direct Mode control system architecture 100, shown to be implemented figuratively within an airplane 10 (illustrated by dashed lines) having a fuselage 12, wings 14 respectively having respective ailerons 108, horizontal stabilizers 16 respectively having respective elevators 110, and a vertical stabilizer 18 having a rudder 112. The Direct Mode control system architecture 100 illustrates how inceptors 102 of the airplane 10 and actuators 104 of the airplane are interconnected and/or intercommunicate in a circumstance in which Normal Mode operation is not appropriate but Direct Mode operation is appropriate, for example, in a circumstance when one or more FBW computers have experienced one or more error(s) or fault(s). The Direct Mode of operation can also be considered a backup mode of operation, in that the airplane 10 enters the Direct Mode of operation when an error or fault has occurred such that the airplane can or should no longer operate in the Normal Mode (or regular or non-backup mode) of operation.

In the Direct Mode control system architecture 100, respective inceptors 102 are shown to be electrically coupled directly to respective actuators (or actuator loop closure circuitry) 104. In the present illustration, the Direct Mode control system architecture 100 includes three of the inceptors 102, but in other embodiments the Direct Mode control system architecture can include a lesser number or greater number of the inceptors. Depending upon the embodiment or implementation, each of the inceptors 102 can be electrically coupled by wires 106, on a one-to-one basis, with a respective one of the actuators 104, or alternatively one or more of the inceptors can respectively be electrically coupled with more than one actuator, and/or alternatively one or more of the actuators can respectively be electrically coupled with more than one of the inceptors.

FIG. 1 particularly illustrates an embodiment in which a first one 116 of the inceptors 102 is coupled by two of the wires 106 to each of a first one 118 of the ailerons 108 and a first one 120 of the elevators 110, a second one 122 of the inceptors 102 is coupled by two of the wires 106 to each of a second one 124 of the ailerons 108 and a second one 126 of the elevators 110, and a third one 124 of the inceptors 102 is coupled by one of the wires 106 to the rudder 112. However, the present disclosure is intended to encompass any of a variety of other embodiments in which any one or more the inceptors 102 is or are coupled, by way of one or more of the wires 106, to any one or more of the actuators 104. Also, in the present example, the wires 106 communicate analog (instead of digital) signals between the inceptors and the actuators 104, albeit in other embodiments the wires can additionally or instead communicate digital signals between the inceptors and the actuators.

The inceptors 102 can include any of a variety of components, devices, or systems that can be actuated by a pilot or other operator, or possibly automatically, so as to communicate command or control input signals. For example, the inceptors 102 can include one or more of any of a side stick, a yoke, a steering wheel, a foot pedal, a push button, and/or any of a variety of other types of devices. The actuators 104 can include any of a variety of components, devices, or systems that can be actuated, directly or indirectly in response to received signals, to cause physical movements or other changes (or behaviors) of one or more components, devices, or systems (or structures or portions) of the airplane 10. For example, the actuators 104 can include electric motors that govern positioning of surfaces such as the ailerons 108, the elevators 110, or the rudder 112 of the airplane 10. One or more of the inceptors 102 can also be coupled with one another (and/or possibly by with one or more of the actuators 104) by way of mechanical linkages 114 (one of which is illustrated).

The Direct Mode control system architecture 100 in the present embodiment is intended to represent the interconnections among the inceptors 102 and the actuators 104 during Direct Mode operation, that is, during operation in which the actuators 104 are controlled to operate in response to command/control input signals provided by the inceptors 102 without any FBW computers or other processing system or device coupled in between the inceptors 102 and the actuators 104. That is, the Direct Mode control system architecture 100 shows the inceptors 102 as being directly coupled to the actuators 104 (by the wires 106) without any FBW computers being coupled therebetween to illustrate that, during Direct Mode operation, the actuators 104 are actuated directly in response to (or directly based upon) command/control input signals provided the inceptors 102 without any intermediary processing or modification of those command/control input signals by any FBW computers linking those inceptors and actuators.

Accordingly, in the present embodiment, this implementation of the Direct Mode (or backup mode) is contained completely within the actuators 104 and allows the actuators to operate even after failure of any or all of the FBW computers (which might otherwise govern operation of the actuators 104 during Normal Mode). When the airplane 10 is operating in the Direct Mode in accordance with the Direct Mode Control System architecture 100, as long as power is applied to the respective ones of the actuators 104, the respective ones of the actuators will operate in accordance with the command/control input signals provided by the inceptors 102 coupled respectively to those respective actuators. For example, with respect to the embodiment shown in FIG. 1, the respective actuators 104 will follow the respective positions of the respective inceptors 102 with respect to which the respective actuators are coupled and provide Direct Mode functionality.

B. Normal Mode—Indirect Connection of FCCs to Inceptors Via Actuators

Although the Direct Mode control system architecture 100 illustrates how inceptors 102 of the airplane 10 and actuators 104 of the airplane are interconnected and/or intercommunicate in a circumstance in which Normal Mode is not appropriate, in other circumstances such as when all of the FBW computers are operating normally (e.g., without experiencing errors or faults) and no other operational mode is appropriate, the airplane 10 can operate in the Normal Mode. In at least some embodiments encompassed herein, when the airplane 10 is operating in the Normal Mode, the actuators 104 are electrically coupled to transmit digitized inceptor position data on one or more Controller Area Network (CAN) buses 201 to one or more Flight Control Computers (FCC) 205. Such electrical coupling of the actuators 104 via the CAN buses 201 allows the FCCs 205 to monitor or listen to all of the position data from all the sensors (e.g., the inceptors 102) and to use voting logic to compare and validate the sensors and then use the validated inceptor position data in the Normal Mode control laws.

Figure 2:
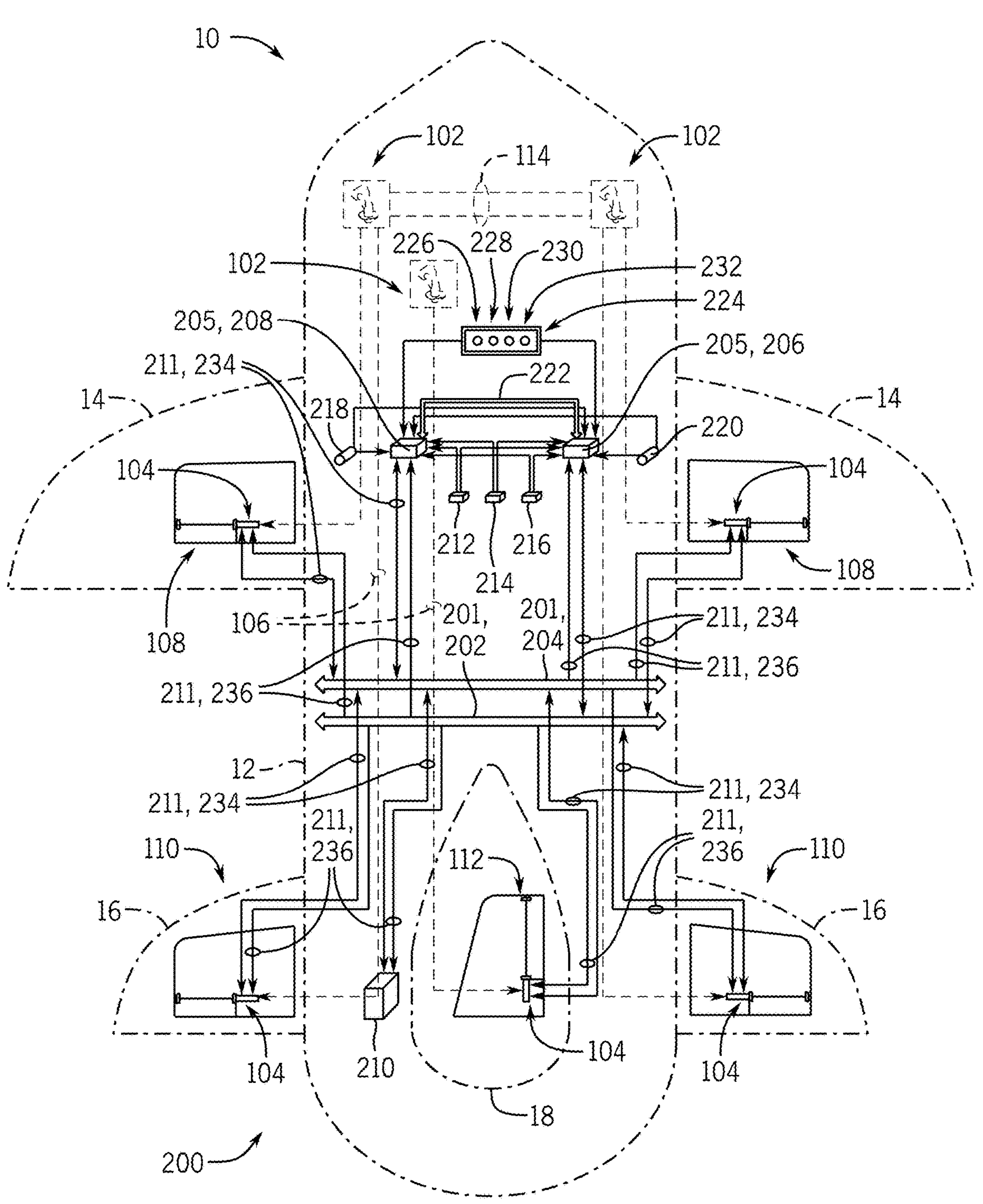
FIG. 2 is a schematic illustration of an example Normal mode control system architecture in accordance an embodiment encompassed herein, and which can be implemented in combination with the example Direct mode control system architecture of FIG. 1.

More particularly, FIG. 2 illustrates schematically an example Normal Mode control system architecture 200 encompassed herein. The Normal Mode control system architecture 200 illustrates how, in the present example embodiment, the inceptors 102 of the airplane 10 and actuators 104 of the airplane are interconnected and/or intercommunicate with one another and additionally with the FCCs 205 in a circumstance in which Normal Mode operation is appropriate (e.g., in which it is not necessary to operate in Direct Mode due to error(s) or fault(s) being experienced by any of the FBW computers of the airplane, and no other operational mode is appropriate). In this embodiment, the Normal Mode control system architecture 200 is a "dual channel" architecture, in which each of the actuators 104 is coupled by two of the CAN buses 201, including a first CAN bus 202 and a second CAN bus 204, both to (or with) two of the FCCs 205, including a first FCC 206 and a second FCC 208, and also to (or with) an engine controller 210. More particularly, each of the actuators 104, each of the FCCs 205 (that is, each of the first FCC 206 and the second FCC 208), and the engine controller 210, is coupled to each (that is, both) of the first and second CAN buses 202 and 204. In this regard, each computer or each actuation controller can be referred to as a channel (or as part of, or as pertaining to, involving, forming, or partly forming, a channel), and so for example the first FCC 206 can be referred to as a first channel, and the second FCC 208 can be referred to as a second channel. Further, in FIG. 2, communications between the CAN buses 201 (again, in this example embodiment, the first and second CAN buses 202 and 204) and each of the actuators 104, the FCCs 205, and the engine controller 210 are represented by arrows 211. Notwithstanding the presence of the arrows 211 in FIG. 2, it should be appreciated that the CAN buses 201 can be coupled directly with each of the actuators 104, the FCCs, 205, and the engine controller 210 without any additional communication links or other structures therebetween (however, alternatively, the arrows can be representative of one or more additional communication links or structures that are provided between one or more of the CAN buses and one or more of the actuators, FCCs, and engine controller).

Further as illustrated, the two FCCs 206, 208 are each coupled to each of three Inertial Measurement Units (IMUs) 212, 214, and 216 (which alternatively can be, or be supplemented by, three Altitude and Heading Reference Systems (AHRSs)), and two angle of attack (AOA) sensors 218 and 220. Also, the two FCCs 206, 208 are coupled for communication with one another as represented by a link 222. Further, the two FCCs 206, 208 are also coupled to a user interface 224 at which inputs can be received from, and/or outputs can be provided to, users regarding, for example, indicated airspeed (IAS) 226, heading (HDG) 228, flight path angle (FPA) 230, and altitude (ALT) 232. The user interface 224 can include, for example, a touch screen, a video screen, a liquid crystal display (LCD), a touch screen, a keyboard, or any of a variety of other types of user interface components, devices, or systems.

As already noted above, in the present embodiment, the actuators 104 are directly coupled to the inceptors 102 in the Normal Mode control system architecture 200, as is likewise the case for the Direct Mode control system architecture 100 of FIG. 1. That is, the present disclosure encompasses, in at least some embodiments, control system architectures that include both the Direct Mode control system architecture 100 such as that shown in FIG. 1 and the Normal Mode control system architecture 200 such as that shown in FIG. 2, in which there is direct coupling between the inceptors 102 and the actuators 104. Further, in at least some embodiments encompassed herein, the FCCs 205 (such as the FCCs 206 and 208) are indirectly coupled to the inceptors 102, not only by the CAN bus(es) 202, 204 but also by the actuators 104. Indeed, in at least some example embodiments encompassed, the inceptors 102 are coupled directly with the actuators 104, and the FCCs 205 such as the FCCs 206 and 208 are coupled only indirectly with the inceptors 102 via the actuators 104 coupled therebetween. Additionally, in at least some example embodiments encompassed herein, the FCCs 205 are coupled only indirectly with the inceptors 102 via the actuators 104 and via the CAN buses 201 linking the actuators 104 with the FCCs 205.

Accordingly, in at least some example embodiments encompassed herein, the inceptor signals from the inceptors 102 are provided specifically to the actuators 104 (or actuator loop closure circuitry). Further, it is only by way of the actuators 104 (and the CAN buses 201 linking those actuators with the FCCs 205) that signals based upon the inceptor signals are provided to the FCCs 205 or other devices encompassed by the Normal Mode control system architecture 200. Additionally, when the airplane 10 is operating in accordance with the Normal Mode control system architecture 200, control of operation of the actuators 104 in response to inceptor signals from the inceptors 102, to the extent such control is determined entirely or partly as a result of operations (e.g., control and/or monitoring operations) of the FCCs 205, involves a "doubling-back" signal propagation path that proceeds from one or more of the inceptors 102, to and via one or more of the actuators 104, to one or more of the FCCs 205 (via one or more of the CAN buses 201), and then back to the actuators 104. That is, to the extent that any operations of the actuators 104 are governed by control signals provided by the FCCs 205 based upon the FCCs' receipt of inceptor signals from the inceptors 102 (or signals based upon such inceptor signals), such control signals are provided from the FCCs 205 to the actuator(s) 104 (e.g., via the CAN buses 201) based upon the receipt by the FCCs of those inceptor signals (or signals based upon those inceptor signals) that are communicated from the inceptors to the actuators and then from the actuators to the FCCs (e.g., via the CAN buses coupling the actuators and FCCs).

It should additionally be noted with respect to FIG. 2 that, in the present embodiment, communications between the CAN buses 201 and the FCCs 205, the actuators 104, and the engine controller 210 can occur in both directions between certain communicating pairs of the CAN buses and the FCCs 205, the actuators 104, and the engine control module 210, but communications only occur in a single direction between certain other communicating pairs of the CAN buses and the FCCs 205, the actuators 104, and the engine control module 210. More particularly, FIG. 2 illustrates some of the arrows 211 as being double-headed arrows 234, which indicate that communications are possible in both directions (e.g., bi-directional communication is allowed), and illustrates others of the arrows 211 as being single-headed arrows 236, which indicate that communications only occur in one direction, toward the respective arrowhead of the respective arrow (e.g., only uni-directional communication is allowed).

More particularly, as indicated by the double-headed arrows 234 linking the first CAN bus 202 with the first FCC 206 and linking the second CAN bus with the second FCC 208, communications between the first FCC 206 and the first CAN bus 202 can occur in both directions between those components, and likewise communications between the second FCC 208 and the second CAN bus 204 can occur in both directions between those components. In contrast, as illustrated by respective single-headed arrows 236 extending from the from the second CAN bus 204 to the first FCC 206 (with the arrowhead pointing toward the first FCC) and extending from the first CAN bus 202 to the second FCC 208, in the present embodiment communications can occur only from the second CAN bus 204 to the first FCC 206 (but not in the opposite direction), and communications can occur only from the first CAN bus 202 to the second FCC 208 (but not in the opposite direction).

Also as illustrated by respective ones of the double-headed arrows 234 linking the first CAN bus 202 with two of the actuators 104 associated with one of the ailerons 108 and one of the elevators 110 (in this, example, the aileron and elevator along the right side of the airplane 10 as illustrated in FIG. 2) and respective ones of the single-headed arrows 236 extending from the second CAN bus 204 to those two actuators, communications can occur in both directions between the first CAN bus 202 and each of those two actuators, but communications can only occur from the second CAN bus 204 to those two actuators (but not in the opposite directions). In contrast, as illustrated by respective ones of the double-headed arrows 234 linking the second CAN bus 204 with the other ones of the actuators 104 (associated with the other, left side, aileron 108 and elevator 110 as well as the rudder 112) and the engine controller 210, and respective single-headed arrows 236 extending from the first CAN bus 202 to those actuators and the engine controller, communications can occur in either direction between the second CAN bus 204 and each of those other actuators and the engine controller, but communications can only occur from the first CAN bus 202 to each of those other actuators and the engine controller (but not in the opposite directions).

Such a communications arrangement as described above in regard to FIG. 2, in which communications in both directions are permitted between some pairs of the CAN buses 201 and certain ones of the FCCs 205, the actuators 104, and the engine controller 210, but communications are only allowed to occur in single directions between other pairs of the CAN buses and certain other ones of the FCCs, the actuators, and the engine controller, can be advantageous. In particular, such a communications arrangement can be advantageous in terms of enhancing the reliability of the overall Normal Mode control system architecture 200 or of an overall FBW control system or architecture of an aircraft such as the airplane 10. Among other things, for example, if a fault occurs with respect to either one (but not both) of the first CAN bus 202 or the second CAN bus 204, then even if such fault may affect the operability of one of the FCCs 205 or some of the actuators 104, it should not affect the operability of both of the FCCs 205 or all of the actuators 104. Further for example, in the present example arrangement, if one of (but not both of) the CAN buses 201 should experience a fault, even if such a fault may impact the controllability of two of the actuators 104 associated respectively with one of the two ailerons 108 and one of the two elevators 110 (e.g., the right side aileron and elevator), it should not affect the controllability of the other ones of the actuators 104 associated with the other one of the ailerons 108 and the other one of the elevators 110 (e.g., the left side aileron and elevator).

Notwithstanding the above discussion regarding the particular manners of communications that can occur between the different pairs of the CAN buses 201 and the FCCs 205, the actuators 104, and the engine controller 210, the present disclosure encompasses numerous other arrangements that allow or involve (or envision) other manners of communications. For example, in another example embodiment encompassed herein, communications can occur in both directions between the second CAN bus 204 and the first FCC 206 and in both directions between the first CAN bus 202 and the second FCC 208, but be limited to occur only in a single direction from the first CAN bus 202 to the first FCC 206 and only in a single direction from the second CAN bus 204 to the second FCC 208. Also for example, in another example embodiment, communications can occur in both directions between the first CAN bus 202 and each of the actuator 104 associated with the rudder 112 and the engine controller 210, and be limited to occur only in a single direction from the second CAN bus 204 to that actuator and in a single direction from that second CAN bus to the engine controller. Further for example, in an additional example embodiment, bi-direction communications can be permitted to occur between each of the CAN buses 201 and each of the FCCs 205, the actuators 104, and the engine controller 210. Also, in a further example embodiment, communications are only permitted to occur in a single direction from respective ones of the FCCs 205, the actuators 104, or the engine controller 210 to respective ones of the CAN buses 201.

Indeed, the present disclosure is intended to encompass a variety of arrangements of Normal Mode control system architectures 200 and FBW control systems or architectures that involve, employ, or allow for communications in any of a variety of manners among CAN buses such as the CAN buses 201, FCCs such as the FCCs 205, actuators such as the actuators 104, and other components, devices, or systems such as the engine controller 210.

C. Dual Lane Command/Command (COM/COM) Actuator Architecture—Fault Tolerant Actuation Controller Employing Pulse Width Modulation (PWM) Command Summing for Trapezoidal Commutation As will be described in further detail below, a Command/Command (COM/COM) architecture is also employed in at least some embodiments described herein. In some such embodiments that have a "dual channel" architecture as described above, within each channel this architecture will employ the COM/COM architecture which is made up of two lanes which both FCCs command. With such an architecture, if one lane fails, the other lane will oppose it (to be fail passive). Thus, a remaining channel (e.g., the second FCC 208 or other aileron actuator) will provide continued operation at the level of the airplane 10 (e.g., the aircraft level). Additionally, because each actuation controller is dual lane, each lane can demodulate the position of any (or each) of the inceptors 102 and transmit that data on the CAN bus to the FCCs to be included in the data validity monitoring. In addition, the dual Command/Command (COM/COM) architecture of the actuation controller (as further described below) causes the Direct Mode functionality to be fault tolerant and fully self-monitored such that malfunctions (e.g., runaways or oscillatory failures) are prevented. Additionally, the command voting logic within each lane of the actuation controller will select the analog inceptor position data as the default if there are no valid commands from either of the FCCs 205 (Direct Mode). Whenever either of the FCCs 206, 208 provides a valid actuator position command (Normal Mode) the actuator 104 will prioritize the FCC command and enable Normal Mode operation.

Further, in at least some embodiments, the present disclosure relates to an improved COM/COM architecture that operates by the summing of trapezoidal commutation Pulse Width Modulation (PWM) voltage commands and the wrap around monitoring of the programmable logic device (PLD) which is providing the PWM command summing. This PLD is a single device that outputs the PWM commands to the inverter, and the wrap around monitor protects against potential common mode faults that could result in erroneous PWM commands being provided to the inverter. The PWM command summing PLD does not contain commutation logic, but rather it operates to average the PWM commands from the two lanes; thus, the monitoring is not critical to the achieving safe operation, but the monitoring provides an extra layer of safety mitigation. In at least some arrangements, motor sensor and output sensor (e.g., regarding control surface position) are blended for smooth and accurate broadband control and monitoring, and comparisons/monitoring of both sensors makes it possible to avoid employing redundant motor or output sensors (and no external position sensors are required for control or monitoring). Also, latent fault exposures are eliminated (self test). In some embodiments, magnetoresistive (MR) sensors are employed.

Figure 3:
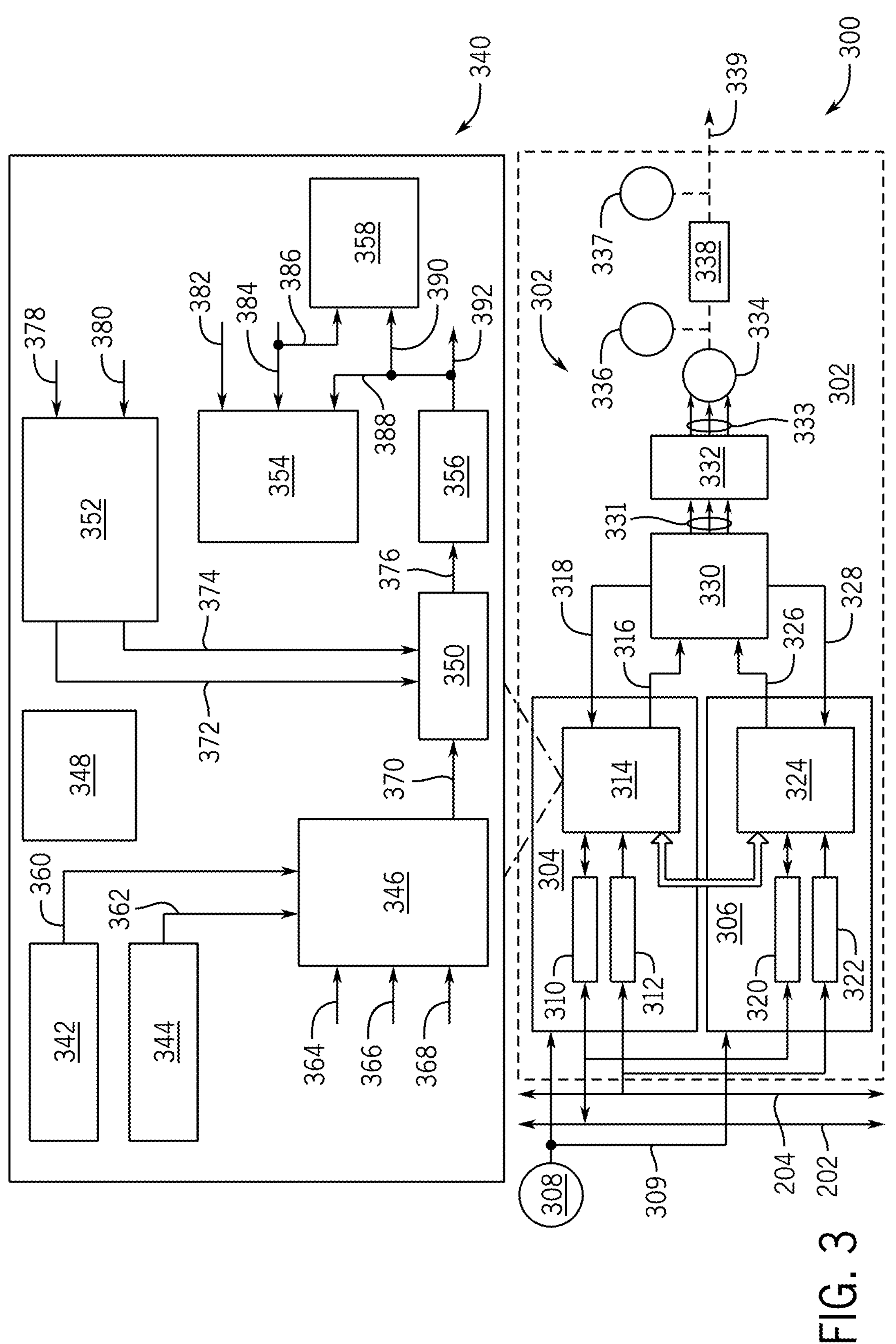
FIG. 3 is a schematic illustration of an example fault tolerant actuation controller architecture in accordance with an embodiment encompassed herein.

More particularly in this regard, referring to FIG. 3, in at least some embodiments the airplane 10 includes a Fault Tolerant Actuation Controller architecture 300 having an Electromechanical (EM) actuation controller (or actuator controller) 302. The Fault Tolerant Actuation Controller architecture 300 is employed as part of the overall control architecture of the airplane 10 described above (involving the combination of the Normal Mode control system architecture 200 and the Direct Mode control system architecture 100), and particularly in regard to the Normal Mode control system architecture 200. The EM actuation controller 302 can be considered to constitute an example of an actuator (or actuation) controller that is associated with or forms part of each (or any) of the actuators 104 of the airplane 10 as shown in FIG. 1 and FIG. 2. In the present example embodiment, the EM actuation controller 302 particularly utilizes a Command/Command (COM/COM) architecture. COM/COM architectures have been in common use in other applications (e.g., for safety critical aerospace control applications) for several decades and provide a robust means for mitigating failure which could result in erroneous actuator motion such as runaway or oscillatory faults.

Additionally, as shown in FIG. 3, it can be seen that the EM actuation controller 302 particularly includes a first lane (or first lane device) 304 and a second lane (or second lane device) 306, each of which is coupled to both of the CAN buses 202 and 204. The first lane 304 includes a first CAN controller 310, a second CAN controller 312, and a first lane PLD 314. The first and second CAN controllers 310 and 312 are respectively coupled between the first lane PLD 314 and the first and second CAN buses 202 and 204, respectively. The second lane 306 includes a third CAN controller 320, a fourth CAN controller 322, and a second lane PLD 324. The third and fourth CAN controllers 320 and 322 are respectively coupled between the second lane PLD 324 and the first and second CAN buses 202 and 204, respectively. Also, in the present example embodiment, communications can occur in both directions between the first CAN bus 202 and each of the first CAN controller 310 and the third CAN controller 320, but only in a single direction from the second CAN bus 204 to the second CAN controller 312 and only in a single direction from the second CAN bus 204 to the fourth CAN controller 322.

Notwithstanding what is shown in FIG. 3, the coupling of the first and second CAN buses 202 and 204, respectively, relative to the first and second CAN controllers 310 and 312, respectively, and relative to the third and fourth CAN controllers 320 and 322, respectively, can be reversed in another embodiment, such that the first CAN controller 310 and the third CAN controller 320 are coupled to the second CAN bus 204, and such that the second CAN controller 312 and the fourth CAN controller 322 are coupled to the first CAN bus 202. Further, in another embodiment, whether communications between the first CAN bus 202 and the second CAN bus 204 relative to the first, second, third, and fourth CAN controllers 310, 312, 320, and 322 can occur in both directions or only in single directions can vary from the manner of communications described with respect to FIG. 3.

Although not necessarily the case in all embodiments, in the present example embodiment the first, second, third, and fourth CAN controllers 310, 312, 320, and 322 can be of the same type (or identical in structure with one another). Further as shown, an inceptor position sensor 308 is coupled to each of the first lane 304 and the second lane 306, as represented by links 309. The inceptor position sensor 308 can be considered to constitute an example of a sensor that is associated with or forms part of each (or any) of the inceptors 102 of the airplane 10 as shown in FIG. 1 and FIG. 2, and the links 309 can be considered to constitute each (or any) of the wires 106 shown in FIG. 1 and FIG. 2 that couple the inceptors 102 with the actuators 104.

Each of the first lane PLD 314 and the second lane PLD 324 is coupled to an additional PLD 330. The first lane PLD 314 and the second lane PLD 324 respectively output first PWM commands (command signals) 316 and second PWM commands 326 for receipt by the additional PLD 330, and the additional PLD 330 returns first average PWM commands (command signals) 318 and second average PWM commands (command signals) 328 back to the first lane PLD 314 and the second lane PLD 324, respectively. Further, the additional PLD 330 sends output signals 331 to an inverter 332, which in turn provides control signals 333 to a motor 334. Operation of the motor 334 is sensed by a motor sensor 336. Further, operation of the motor 334, via gear reduction 338, causes movement of a control surface 339, which is sensed by an output position sensor 337. The control surface 339 is intended to be representative of any of the ailerons 108, the elevators 110, or the rudder 112 (or other controlled components, devices, or systems) of the airplane 10. Although the EM actuation controller 302 is shown in FIG. 3 as including each of the first lane 304, the second lane 306, the additional PLD 330, the inverter 332, the motor 334, the motor sensor 336, the gear reduction 338, and the output position sensor 337, the EM actuation controller can in other circumstances or embodiments be understood (or defined) differently, for example, as omitting one or more of these components, devices, or systems (e.g., omitting one or more of the gear reduction 338, the output position sensor 337, the motor sensor 336, and/or the motor 334).

Additionally, as shown in FIG. 3, details of operation of each of the first lane PLD 314 and the second lane PLD 324 are further provided in a block diagram 340 shown in FIG. 3. Although FIG. 3 shows the block diagram 340 as particularly relating to the first lane PLD 314, it should be understood that the details of operation represented by the block diagram 340 are equally applicable in terms of representing the details of operation of the second lane PLD 324 (that is, the details of operation of the first lane PLD 314 are the same or substantially the same as for the second lane PLD 324). As illustrated by FIG. 3, operation of the first lane PLD 314 includes position command selection as represented by a Position Command Selection block 346, in response to receiving FCC #1 CAN commands 364, FCC #2 CAN commands 366, and inceptor position (default) information 368. The position command selection as represented by the block 346 is also based upon a FCC #1 Valid signal 360 as provided by a FCC #1 CAN Command Comparison Monitor block 342, and a FCC #2 Valid signal 362 as provided by a FCC #2 CAN Command Comparison Monitor block 344. The FCC #1 CAN Command Comparison Monitor block 342 monitors signals received from the first FCC 206 via each of the first CAN bus 202 and the second CAN bus 204 and determines whether there is any discrepancy between those respective signals, and provides the FCC #1 Valid signal 360 if there is no discrepancy. The FCC #2 CAN Command Comparison Monitor block 344 monitors signals received from the second FCC 208 via each of the first CAN bus 202 and the second CAN bus 204 and determines whether there is any discrepancy between those respective signals, and provides the FCC #2 Valid signal 362 if there is no discrepancy.

Operation of the Position Command Selection block 346 results in the providing of a selected position command 370 to a Control Law block 350. In addition to receiving the selected position command 370, the Control Law block also receives a position estimate signal 372 and a rate estimate signal 374 as provided by a Motor Position & Output Position Complementary Filter block 352, which generates the position estimate signal 372 and the rate estimate signal 374 based upon motor sensor data 378 and output sensor data 380 received by the Motor Position & Output Position Complementary Filter block 352. Based upon the selected position command 370, the position estimate signal 372, and the rate estimate signal 374, the Control Law block 350 generates an output signal 376 that is provided to a PWM Commutation block 356, which in turn outputs PWM Commands as represented by an arrow 392, which are provided to a Cross Lane Command Comparison Monitor block 358 as indicated further by an arrow 390, and also to a PWM PLD monitor block 354 as indicated additionally by an arrow 388. The PWM PLD monitor block 354 further operates based upon the PWM Commands 392 received as indicated by the arrow 388, but also based upon average PWM feedback as represented by an arrow 382 and based upon Cross Lane PWM commands as represented by an arrow 384. Further, the Cross Lane Command Comparison Monitor 358 operates based upon both the PWM Commands 392 received as indicated by the arrow 390, but also based upon the Cross Lane PWM commands as represented further by an arrow 386. Additionally, operation of the first lane PLD 314 also includes operation in accordance with Power Valid Engage Logic as represented by a Power Valid Engage Logic block 348.

D. Overall FCS Architecture—Dual Lane FCCs, Wrap Back Monitor, Dual CAN Buses In at least some embodiments, the present disclosure relates to one or more improved top-level Flight Control System (FCS) architectures. Such improved top-level FCS architectures are minimally complex systems intended for smaller aircraft (e.g., Federal Aviation Administration "Part 23" aircraft) such as piston or single engine turbine powered aircraft—and including, for example, the airplane 10 discussed above with respect to FIG. 1, FIG. 2, and FIG. 3. In this regard, it should be appreciated that such improved top-level FCS architectures encompassed by the present disclosure are in contrast to other types of FCS architectures that may be suitable for larger commercial aircraft (e.g., Federal Aviation Administration "Part 25" aircraft). Such other types of FCS architectures suitable for larger commercial aircraft employing FBW systems can include, for example, a triplex or quadraplex baseline architecture. In contrast with such other types of FCS architectures suitable for larger commercial aircraft, which are generally able to maintain Minimum Acceptable Control (MAC) after two (2) failures, the improved top-level FCS architectures encompassed by the present disclosure are designed to ensure MAC after any single failure as well as some combination(s) of two (2) failures (without consideration for the backup Direct Mode).

Figure 4:
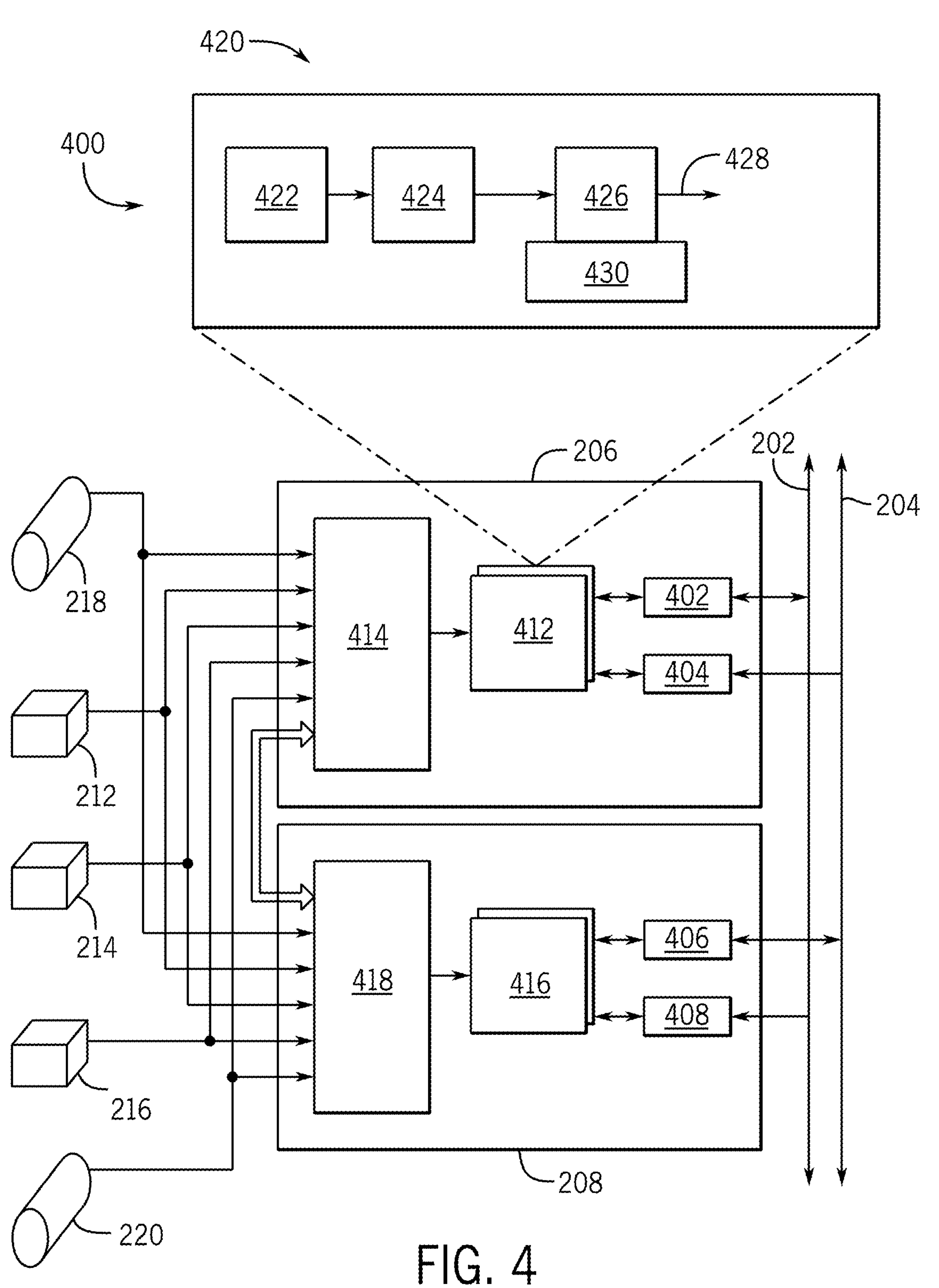
FIG. 4 illustrates an example top-level flight control system (FCS) FCS architecture in accordance with an embodiment encompassed herein.

More particularly in this regard, FIG. 4 illustrates, as an example baseline architecture, an example embodiment of an improved top-level FCS architecture 400 encompassed herein. The FCC architecture 400 as shown in FIG. 4 includes each of the first FCC 206 and the second FCC 208 discussed above. Consistent with FIG. 2, FIG. 4 shows that each of the first FCC 206 and the second FCC 208 is coupled to each of the first CAN bus 202 and the second CAN bus. Also consistent with FIG. 2, FIG. 4 shows that each of the first FCC 206 and the second FCC 208 is coupled to each of the three IMUs 212, 214, and 216 (or, alternatively, three Attitude and Heading Reference Systems (AHRSs)) and the two AOA sensors 218 and 220. In the present embodiment, the airplane 10 system operating in accordance with the improved top-level FCS architecture 400 communicates with the avionics system to receive air data (e.g., airspeed, altitude, etc.), and also is coupled to the Autopilot modes along with warning and alert system information. Further, in at least some embodiments or implementations, the airplane 10 system operating in accordance with the improved top-level FCS architecture 400 is capable of communicating with a smart engine controller and providing thrust commands to achieve complete control authority over flight path and speed. In at least some (but not all) embodiments, the dual CAN bus architecture (including both CAN buses 202 and 204) acts as the system bus, in which the pilot side equipment transmits on the first CAN bus 202 and the copilot side equipment transmits on the second CAN bus 204.

The improved top-level FCS architecture 400 can be understood (or defined) to include each of the first CAN bus 202 and the second CAN bus 204, and each of the IMUs 212, 214, and 216 and AOA sensors 218 and 220, as well as possibly one or more of the actuators 104 (coupling to the actuators 104 can be via the CAN buses). Alternatively, in other embodiments (or if defined differently), the improved top-level FCS architecture need not include one or more of these devices, components, or systems. Additionally, although not shown in FIG. 4, the improved top-level FCS architecture 400 architecture can also include one or more of the actuators 104, such as (as shown in FIG. 2) two aileron actuators (one actuator on each of the ailerons 108), two elevator actuators (each on a respective half of the split elevator or horizontal stabilizer, or on the two elevators 110 of FIG. 2) and one rudder actuator (associated with the rudder 112 on the vertical stabilizer).

In the present example embodiment, the first FCC 206 particularly includes a first CAN controller 402 and a second CAN controller 404, and the second FCC 208 includes a third CAN controller 406 and a fourth CAN controller 408. In the present embodiment the first CAN controller 402, second CAN controller 404, third CAN controller 406, and fourth CAN controller 408 can respectively take the same form as (or be identical to) the first CAN controller 310, the second CAN controller 312, the third CAN controller 320, and the fourth CAN controller 322, respectively. However, in other embodiments, the CAN controllers 402, 404, 406, and 408 of the first FCC 206 and second FCC 208 need not be the same as those provided in the Electromechanical (EM) actuation controller 302 of FIG. 3. Further, the first FCC 206 also includes a first processing unit (or processor) 412 and a second processing unit (or processor) 414, and the second FCC 208 also includes a third processing unit (or processor) 416 and a fourth processing unit (or processor)

418. In the present embodiment, each of the first, second, third, and fourth processing units 412, 414, 416, and 418 can be a respective PLD, although in other embodiments one or more of the processing units can take other forms (e.g., the form of a microprocessor or an application specific integrated circuit (ASIC)). Further as shown, the first processing unit 412 is coupled between the second processing unit 414 and each of the first and second CAN controllers 402 and 404. Also, the third processing unit 416 is coupled between the fourth processing unit 418 and each of the third and fourth CAN controllers 406 and 408.

Additionally, as shown, the first CAN controller 402 and fourth CAN controller 408 are both coupled to the first CAN bus 202, and are respectively coupled between the first CAN bus 202 and the first processing unit 412 and the third processing unit 416, respectively. Also, the second CAN controller 404 and third CAN controller 406 are both coupled to the second CAN bus 204, and are respectively coupled between the second CAN bus 202 and the first processing unit 412 and the third processing unit 416, respectively. Further as shown, each of the second processing unit 414 and the fourth processing unit 418 is coupled to each of the IMUs 212, 214, and 216 and each of the AOA sensors 218 and 220. Accordingly, the second processing unit 414 is coupled between the first processing unit 412 and each of the IMUs 212, 214, and 216 and AOA sensors 218 and 220, and the fourth processing unit 418 is coupled between the first processing unit 412 and each of the IMUs 212, 214, and 216 and AOA sensors 218 and 220.

Additionally with respect to the present example embodiment of FIG. 4, each of the first processing unit 412 of the first FCC 206 and the third processing unit 416 of the second FCC 208 is configured to perform lockstep processing. By comparison, each of the second processing unit 414 of the first FCC 206 and the fourth processing unit 418 of the second FCC 208 serves as an input/output ("I/O") device and can include an operate by hardware, software, or a combination of hardware and software. Also, the fault tolerant capability of the airplane 10 system is enabled by the COM/COM architecture within the FCCs 205 (e.g., the FCCs 206 and 208) and the actuation controllers such as the EM actuation controller 302 of FIG. 3. This fault tolerance ensures that erroneous valid commands are extremely improbable, both in the FCCs 205 and within the actuation controllers such as the EM actuation controller 302 of FIG. 3. This fault tolerance ensures that first failures are mitigated within specific one(s) of the FCCs 205 or the actuation controllers (again such as the EM actuation controller 302) and allow the remaining resources to maintain correct control. There is no need for a triplex computer system to vote out the erroneous channel.

In at least some embodiments encompassed herein, the COM/COM architecture in each of the FCCs 206, 208 is accomplished by use of a lockstep processor (such as the TI Hercules TMS570 processor available from Texas Instruments, Inc. of Dallas, Texas) employed in, or as part of, each of the first processing unit 412 and the third processing unit 416. Further, such a lockstep processor can be implemented in combination (or along) with an input sensor voting plane and Cyclic Redundancy Check (CRC) protection of all output commands, as can be provided at least in part by each of the second processing unit 414 and the fourth processing unit 418. As represented figuratively by a block diagram 420, the FCC 206 (and particularly the lockstep processor of the first processing unit 412) operates to produce high integrity actuator commands through a particular signal processing flow. Although the block diagram 420 is illustrated as corresponding to the first FCC 206 (and particularly the lockstep processor of the first processing unit 412), the block diagram 420 is equally representative of (and applicable to) the second FCC 208 (and particularly the lockstep processor of the third processing unit 416).

More particularly, as represented by a Sensor Voting block 422 of the block diagram 420, the first FCC 206 first operates to receive sensor data (e.g., from any of the IMUs 212, 214, and 216 or any of the AOA sensors 218 and 220) at the second processing unit 414 and performs sensor voting in relation to the received sensor signals. Sensor voting processing as represented by the sensor voting block 422 (at the sensor voting plane) will mitigate any potential erroneous sensor data from a single sensor. For example, if three different sensor signals concerning a given sensor output are received, and two of those sensor signals match one another but the third sensor signal does not match the other two, then the sensor voting processing can select the sensor signal corresponding to the two matching sensor signals as the correct signal (because it corresponds to the majority of the received sensor signals) and disregard the third sensor signal. Next, based upon the processed sensor data, a control law is applied (or control laws are applied) as represented by a Control Law block 424. Further, as represented by a Message Formatting block 426, the output of the Control Law block 424 is further processed to result in the output of high integrity actuator commands, as represented by an output arrow 428. Additionally, generation of the high integrity actuator commands corresponding to the output arrow 428 in accordance with the Message Formatting block 426 particularly involves a process in entailing validity verification, CRC protection, and freshness confirmation, as represented by a block 430 that is part of (or associated with) the Message Formatting block 426.

It should be recognized that the CRC of output commands mitigates any potential corruption of the output commands as those output commands pass through the CAN controller. And the lockstep processor (which for example can employ the safety architecture of the aforementioned TI Hercules TMS570 processor) mitigates erroneous computations within the processor due to hardware faults or memory faults. Because each of the FCCs 206 and 208 is fault tolerant and capable of producing high integrity commands protected by a CRC, the system can operate in an Active/Standby FCC arrangement, where one of the FCCs is the active channel commanding all of the actuators while the other one of the FCCs is in Standby mode, synchronizing to the master channel modes and target values and ready to assume control if the master has a fault and stops working.

E. Electrical Architecture for FBW System

As described above, the present disclosure relates to and includes a variety of FBW control systems and architectures as can be implemented in any of a variety of types of aircraft such as the airplane 10. Such FBW control systems and architectures can include one or more of the Direct Mode control system architecture 100, the Normal Mode control system architecture 200, the Fault Tolerant Actuation Controller architecture 300, and/or the improved top-level FCS architecture 400 described above, and/or one or more other FBW control systems or architectures (including possibly one or more control systems or architectures that are not FBW control systems or architectures). Additionally, the present disclosure also relates to electrical systems and electrical architectures of aircraft such as the airplane 10, which provide required electrical power to the FBW control systems or architectures (or other control systems or architectures) of the aircraft. To be suitable for servicing such a FBW control system or architecture with the requisite electrical power, the electrical system (or architecture) must match the reliability and availability requirements of the FBW system (or architecture). So as to achieve such reliability and availability goals, at least some embodiments of electrical systems (or architectures) encompassed herein employ a combination of two dissimilar sources of electrical power, such as the combination of a permanent magnet generator (PMG) and a battery that serves as a reservoir for stored energy (and which additionally can provide regenerative energy management). In at least some such embodiments, electric power from the PMG source is conditioned by an AC/DC converter regulator to match the power sourced from the battery.

Figure 5:
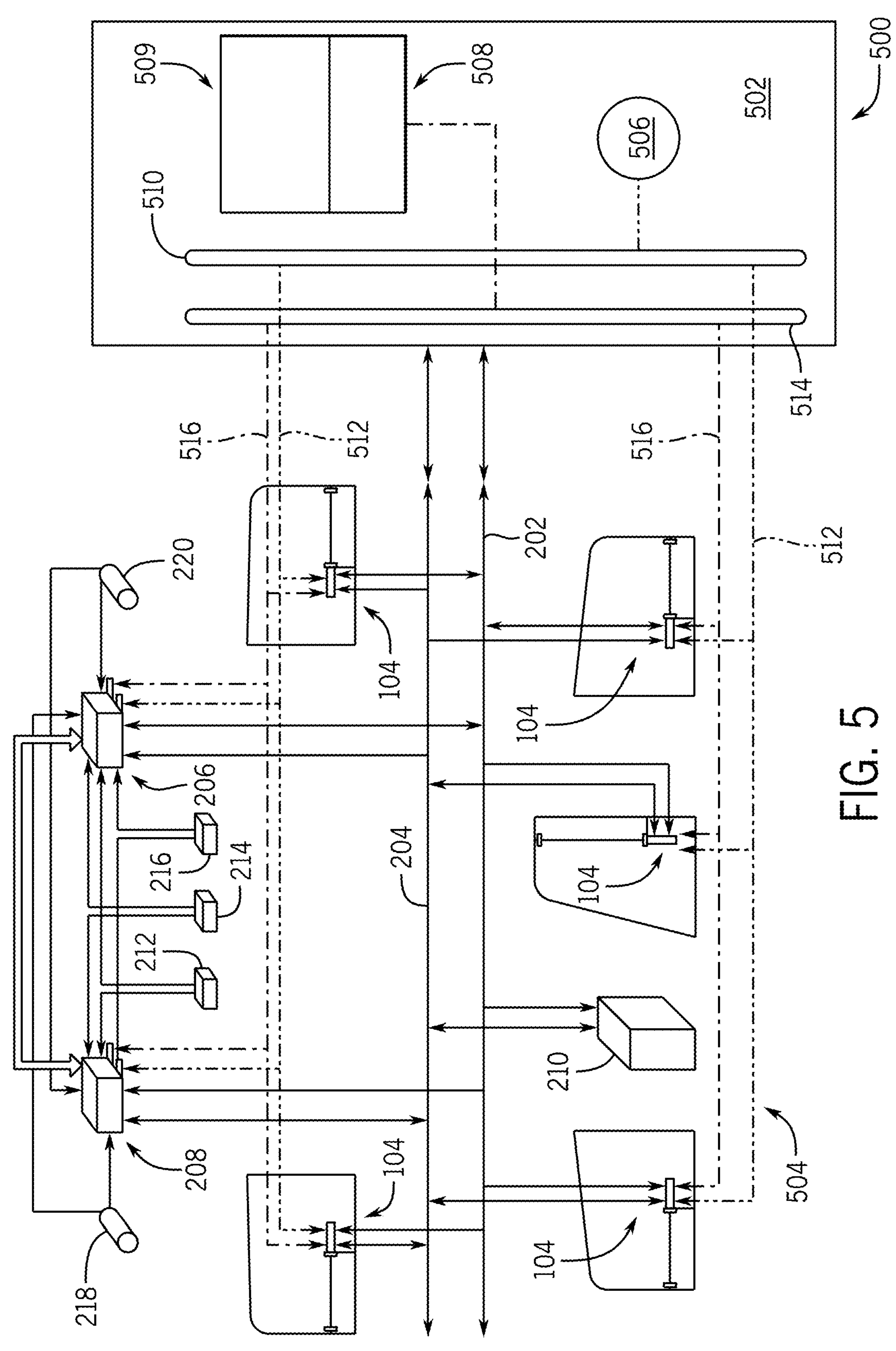
FIG. 5 illustrates an example FBW system electric architecture in accordance with an embodiment encompassed herein.

Referring to FIG. 5, an example FBW system electric architecture 500 suitable for the airplane 10 is shown in schematic form. FIG. 5 shows the FBW system electric architecture 500 in combination with system components 504 that require electric power and that have already been described above (e.g., in connection with the Direct Mode control system architecture 100, the Normal Mode control system architecture 200, the Fault Tolerant Actuation Controller architecture 300, and/or the improved top-level FCS architecture 400). In particular, it will be recognized that the system components 504 shown in FIG. 5 include the actuators 104 (e.g., five flight actuators associated with the ailerons 108, elevators 110, and rudder 112), the first and second CAN buses 202 and 204, respectively, the first and second FCCs 206 and 208, respectively, the engine controller 210, the IMUs 212, 214, and 216, and the AOA sensors 218 and 220. Although the FBW system electric architecture 500 can be understood (or defined) as excluding the system components 504 with respect to which electric power is being provided, the FBW system electric architecture can also (or alternatively) be understood (or defined) as including those system components.

In the example embodiment of the FBW system electric architecture 500 of FIG. 5, power is supplied to the system components 504 by an electric power system 502, with (as shown in FIG. 5) power being provided by either a PMG 506 or a battery 508. The power provided by each of the PMG 506 and the battery 508 can be, for example, 40 Volt power. In the embodiment of FIG. 5, the electric power system 502 particularly provides redundant power to the actuators 104 (e.g., the five flight actuators) and to the first and second FCCs 206 and 208, respectively. Power is distributed both from a PMG bus 510 (to which the PMG 506 is coupled as shown) via first power linkages (electric power distribution linkages) 512, and from a battery bus 514 (to which the battery 508 is coupled as shown) via second power linkages (electric power distribution linkages) 516. As will be described in further detail below, there can be two power distribution units (PDUs), where each PDU contains a solid state power controller (SSPC) for power control and protection. Also, the electric power system employs common control circuits with actuators, and redundant CAN bus communications (e.g., by using the CAN buses 202 and 204). Recoverable regenerative energy is also utilized, by a regenerative energy management system 509 that operates in conjunction with the battery 508 (e.g., through energy storage via the battery and via an associated capacitor bank).

More particularly, in the present example embodiment, the FBW system electrical architecture 500 features include providing redundant power to the actuators 104 (e.g., the five ones of the actuators 104 shown in FIG. 1 and FIG. 2, each of which may be a respective flight actuator), and to the two FCCs 206 and 208. Each of the actuators 104 can also be considered to be a respective combination of a respective actuator and a respective controller (or control circuit), for example, as represented by the EM actuation controller 302 of FIG. 3. Electric power is provided by the PMG 506 and the battery 508. More particularly, as represented by the first power linkages 512, the PMG bus 510 is coupled to each of the actuators 104 and each of the two FCCs 206 and 208 and, as represented by the second power linkages 516, the battery bus 514 is also coupled to each of the actuators and each of the two FCCs. As already noted, two Power Distribution Units (PDUs) are employed to distribute power (see FIG. 6 and FIG. 7) and each contains solid state power controllers (SSPCs) to achieve power control and protection, where the SSPCs can be bi-directional power switches with local current sensors. As described previously, there can also be redundant CAN bus communications (via the CAN buses 202 and 204). Also, there is regenerative energy management functionality (Regen Energy Management Function) for recovering regenerative energy, where the recovery of regenerative energy is enabled by the bi-directional SSPCs and capacitor banks. Such regenerative energy management and the use of capacitor banks allows for the storing and recovery of regenerative energy rather than the dissipation of such energy (e.g., conversion of energy to heat).

Figure 6:
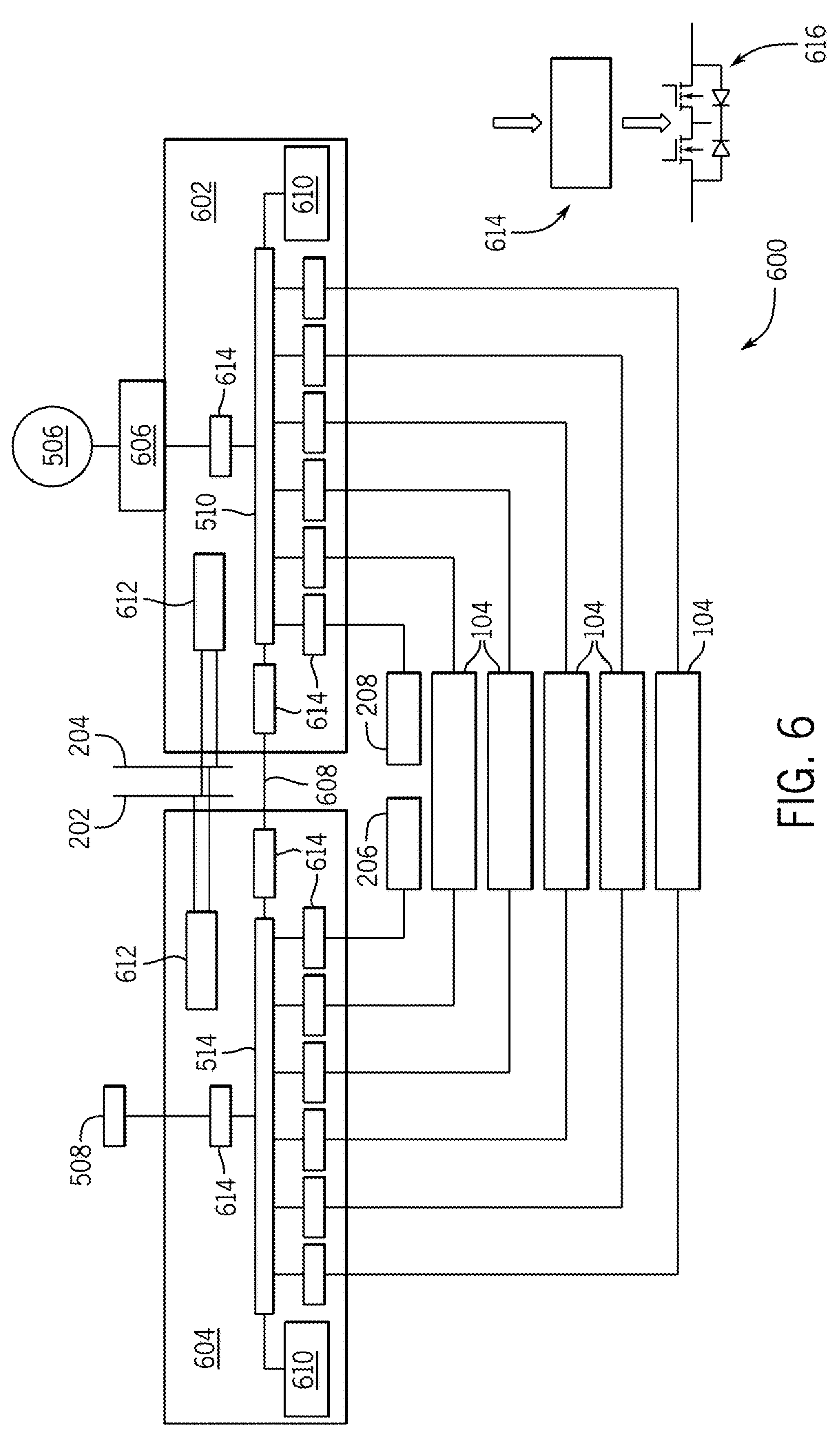
FIG. 6 is a block diagram that illustrates an example electrical system for a FBW system in accordance with an embodiment encompassed herein.

Turning to FIG. 6, a first block diagram 600 is provided to illustrate in more detail the FBW system electric architecture 500 of FIG. 5, again in combination with several of the system components 504 shown also in FIG. 5. The first block diagram 600 particularly illustrates example connections among a first FBW distribution box 602 and a second FBW distribution box 604 relative to the battery 508, the PMG 506, and several of the system components 504, including particularly the first and second FCCs 206 and 208, the first and second CAN buses 202 and 204, and the actuators 104 (e.g., five of the actuators as shown in FIG. 1, each of which can also be considered a respective actuator and controller). The second FBW distribution box 604 is coupled with the battery 508 and the first FBW distribution box 602 is coupled to the PMG 506 via an alternating current/direct current (AC/DC) converter 606. Additionally, each of the first and second FBW distribution boxes 602 and 604 is coupled to each of the first and second CAN buses 202 and 204, each of the (in this example, five) actuators 104, and each of the first and second FCCs 206 and 208. Also, the two FBW distribution boxes are coupled to one another by a cross-tie 608.

Further as shown, each of the FBW distribution boxes 602 and 604 internally includes a respective internal bus, namely, the PMG bus 510 within the first FBW distribution box 602 and the battery bus 514 within the second FBW distribution box 604. Also, each of the FBW distribution boxes 602 and 604 includes a respective capacitor bank 610, respective controls 612 (coupled to both of the CAN buses 202, 204), and a plurality of SSPCs 614. More particularly, the PMG bus 510 of the first FBW distribution box 602 is coupled by way of respective ones of the SSPCs 614 to each of the second FCC 208, the cross-tie 608, the AC/DC converter 606, and each of the actuators 104 (with there being eight of the SSPCs in all). Also, the battery bus 514 of the second FBW distribution box 606 is coupled by way of respective ones of the SSPCs 614 to each of the first FCC 206, the cross-tie 608, the battery 508, and each of the actuators 104 (with there being eight of the SSPCs in all). Additionally, FIG. 6 also provides a representative electric circuit portion 616 of an example one of the SSPCs 614.

Figure 7:
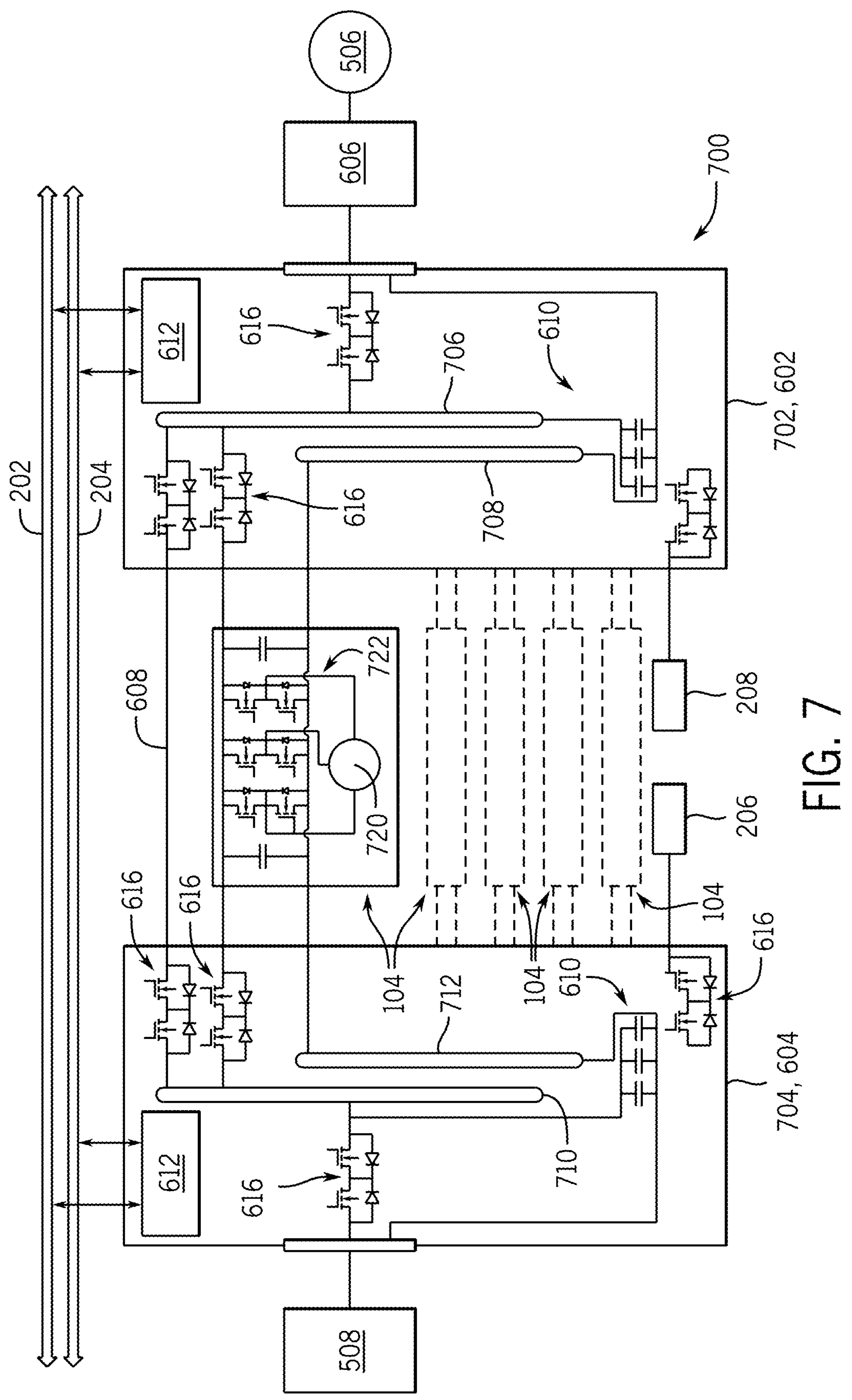
FIG. 7 is a block diagram that illustrates an example power distribution unit (PDU) circuit topology in accordance with an embodiment encompassed herein.

Referring additionally to FIG. 7, a second block diagram 700 is provided that illustrates in more detail a PDU circuit topology for the FBW system electric architecture 500 described with reference to FIG. 5 and FIG. 6, again in combination with several of the system components 504 (again including particularly the first and second FCCs 206 and 208, the first and second CAN buses 202 and 204, and the actuators 104). The PDU circuit topology shown by the second block diagram 700 of FIG. 7 effectively illustrates schematically, in even greater detail than the first block diagram 600, aspects of the embodiment of the FBW system electric architecture 500 that is shown in FIG. 6. More particularly, FIG. 7 shows first and second PDUs 702 and 704, respectively, which respectively correspond to the first and second FBW distribution boxes 602 and 604, respectively, and which respectively show internal components of those respective FBW distribution boxes in more detail. In particular, it should be appreciated that the PMG bus 510 of the first FBW distribution box 602 includes a first power bus portion 706 and a first ground bus portion 708 as shown in the first PDU 702. The capacitor bank 610 of the first FBW distribution box 602 and first PDU 702 is coupled between the bus portions 706 and 708 and serves as a regenerative capacitor bank. Similarly, it should be appreciated that the battery bus 514 of the second FBW distribution box 604 includes a second power bus portion 710 and a second ground bus portion 712 as shown in the second PDU 704. Also, the capacitor bank 610 of the second FBW distribution box 604 and second PDU 704 is coupled between the bus portions 710 and 712 and serves as a regenerative capacitor bank.

It should be appreciated that, in at least some embodiments, the FBW system electric architecture 500 (or other embodiments encompassed herein) relates to or includes a power distribution system (or architecture) that enables bi-directional power flow, and that particularly enables regenerative energy to flow from the FBW actuators (e.g., the actuators 104) to an electrical system energy storage system that includes the battery 508 (or another battery system) in combination with or coupled with the capacitor bank 610 (or another bank of capacitors). The capacitors that are included within a capacitor bank such as the capacitor bank 610 can take any of a variety of forms depending upon the embodiment and, in at least some embodiments, are or include super capacitors.

Also, FIG. 7 shows in more detail figuratively how several of the electric circuit portions 616 corresponding to the SSPCs 614 are coupled between the first power bus portion 706 of the PMG bus 510 and each of the AC/DC converter 606 (which in turn is coupled to the PMG 506), the second FCC 208, the cross-tie 608, and the actuators 104. Similarly, FIG. 7 also shows in more detail figuratively how several of the electric circuit portions 616 corresponding to the SSPCs 614 are coupled between the second power bus portion 710 of the battery bus 514 and each of the battery 508, the first FCC 206, the cross-tie 608, and the actuators 104. In the present example, one of the actuators 104 particularly is shown to include both a motor 720 and control circuitry 722, as a representation of each of the actuators (each of which can be a combination actuator and controller, and each of which can correspond to the EM actuation controller 302 of FIG. 3). Also, FIG. 7 again shows that the respective controls 612 of each of the first PDU 702 and the second PDU 704 are coupled to each of the first CAN bus 202 and the second CAN bus 204.

Notwithstanding the above description, the present disclosure is intended to encompass additional embodiments. Further for example, although linkages and connections described herein can be provided by wires, in other embodiments one or more of the linkages and connections described herein can be provided by other structures, or even be provided by wireless communication links. Also, embodiments of the present disclosure are intended to include any of a variety of types of aircraft employing FBW electric control systems and methods as described herein. Additionally, the present disclosure also includes a wide variety of methods, processes, and manners of operation, including methods of operation in which a control system, or an aircraft having a control system operates in, and/or transitions between or among, different operational modes or manners of operation. Also, notwithstanding particular discussion or operation in a Direct Mode and a Normal Mode herein, the present disclosure additionally includes embodiments in which a control system is configured to operate in one or more other modes of operation, such as a Standby Mode, Autopilot Mode, Auxiliary Mode, or other alternative modes, in addition to or instead of one or both of the Direct Mode and the Normal Mode. Further, although one or more embodiments described herein envision sets of components in which there are a pair of identical or similar-type components (e.g., the first and second FCCs 206 and 208, the first and second CAN buses 202 and 204, etc.) and/or envision dualistic or redundant operation involving pairs of identical or similar-type components, the present disclosure also includes alternate embodiments in which there are more than two (e.g., three) components that are identical or similar in type, as well as alternate embodiments in which there is only a single component of a particular type (for example, only a single CAN bus even though there may be more than one FCC).

Further, notwithstanding any description provided herein, it should be appreciated that the use of the term "safety" herein is not a representation that any embodiment described or encompassed herein will operate in a safe manner on any particular occasion or in any particular circumstance. Safe operation of any system may depend on many factors outside the scope of the present disclosure, such as the manners of installation, operation, or maintenance, of the system. All physical systems are susceptible to failure and provision must be made for such failure.

It is specifically intended that the present invention not be limited to the embodiments and illustrations contained herein, but include modified forms of those embodiments including portions of the embodiments and combinations of elements of different embodiments as come within the scope of the following claims.

What is claimed is:

1. A fly-by-wire (FBW) control system for an aircraft, the control system being configured to provide a direct mode of operation and also a normal mode of operation, the control system comprising:

- a plurality of inceptors;
- a plurality of actuators;
- a plurality of first linkages, wherein each of the inceptors is electrically coupled to a respective one or more of the actuators by a respective one or more of the first linkages, so that each of the first linkages respectively electrically couples a respective pair of the inceptors and actuators;
- a first flight control computer (FCC) coupled to the actuators by at least one further linkage, wherein the first FCC is coupled to at least one of the inceptors only indirectly by at least one of the actuators and the at least one further linkage, wherein, during the normal mode of operation, the actuators of the plurality of actuators are actuated in response to control signals provided by the first FCC received via the at least one further linkage, and wherein, during the direct mode of operation, the actuators of the plurality of actuators are actuated in response to inceptor signals generated by the inceptors that are communicated directly by the first linkages from the inceptors to the actuators.

2. The FBW control system of claim 1, wherein the control system is configured to achieve Minimally Acceptable Control after any single failure as well as at least some combinations of two failures.

3. The FBW control system of claim 1, wherein the first FCC is coupled to receive additional signals from either at least three Inertial Measurement Units (IMUs) or two Angle-of-Attack (AOA) sensors, and wherein the first FCC includes at least one processing device that is configured to perform one or more of (a) lockstep processing, (b) input sensor voting processing, and (c) Cyclic Redundancy Check (CRC) protection.

4. The FBW control system of claim 1, wherein neither the first FCC nor a second FCC of the FBW control system is coupled to any of the inceptors in other than an indirect manner in which one or more of the actuators is or are coupled between one or more of the inceptors and one or both of the first FCC or the second FCC.

5. The FBW control system of 1, further comprising an actuation controller included by at least one of the actuators, wherein the actuation controller has a dual lane command/command architecture that is configured to develop an output signal in which the output signal is determined at least in part based upon a trapezoidal summing of a first additional signal from a first lane processing device and a second additional signal from a second lane processing device.

6. The FBW control system of claim 5, wherein the actuation controller one or both of (a) generates further signals for provision at least indirectly to a motor, and (b) operates based at least in part upon a motor sensor signal and an output sensor signal.

7. The FBW control system of claim 1 wherein, during the direct mode of operation, the inceptor signals that are communicated directly by the linkages from the inceptors to the actuators occur without any intermediate processing by any processing devices interposed between the inceptors and the actuators.

8. The FBW control system of claim 7, wherein the plurality of inceptors includes a first inceptor that is either a side stick or a yoke, wherein the plurality of actuators includes a first actuator that is a flight surface control actuator, and wherein the plurality of first linkages includes a first wire linkage that electrically couples the first inceptor and the first actuator.

9. The FBW control system of claim 8, wherein the first inceptor, the first actuator, and the first wire linkage are configured so that, during the direct mode of operation, upon the first inceptor being rotated by a first number of degrees, the first actuator is actuated to cause a control surface associated with the first actuator to rotate by a second number of degrees, wherein the second number is linearly or proportionally related to the first number.

10. The FBW control system of claim 1, wherein the at least one further linkage includes a first controller area network (CAN) bus electrically coupling the first FCC at least indirectly with the actuators, and wherein, during the normal mode of operation, the control signals are based at least indirectly upon one or more additional signals received by the first FCC from the actuators, wherein the one or more additional signals are based at least indirectly upon second inceptor signals from the inceptors that are communicated directly by the first linkages from the inceptors to the actuators.

11. The FBW control system of claim 10, wherein the at least one further linkage additionally includes a second CAN bus electrically coupling the first FCC at least indirectly with the actuators.

12. The FBW control system of claim 11, further comprising a second FCC, wherein each of the first CAN bus and the second CAN bus electrically couples each of the first FCC and the second FCC at least indirectly with the actuators, wherein the control system additionally is configured to perform wrap back monitoring, and wherein each of the first FCC and the second FCC is configured to perform lockstep processing.

13. An electric power system for an aircraft employing the FBW control system of claim 1, the electric power system comprising:

a plurality of power sources including a permanent magnet generator (PMG) and an electric battery, wherein each of the actuators of the plurality of actuators is configured to be able to receive first power from a respective first one of the power sources and second power from a respective second one of the power sources, wherein the electric power system includes a power distribution system or architecture that enables bi-directional power flow, so as to enable regenerative energy to flow from the actuators to an electrical system energy storage system that includes the electric battery coupled with a bank of capacitors.

14. An aircraft comprising the FBW control system of claim 1.

15. A fly-by-wire (FBW) control system for an aircraft, the control system comprising:

a plurality of inceptors;

a plurality of actuators;

a plurality of first linkages, wherein each of the inceptors is electrically coupled to a respective one or more of the actuators by a respective one or more of the first linkages, so that each of the first linkages respectively electrically couples a respective pair of the inceptors and actuators;

at least one controller area network (CAN) bus;

at least one flight control computer (FCC) coupled to the plurality of actuators by the at least one CAN bus, wherein the at least one FCC is coupled to the inceptors only indirectly by the plurality of first linkages and the at least one CAN bus, with the plurality of actuators being coupled between the at least one CAN bus and the plurality of first linkages.

16. The control system of claim 15, wherein the at least one FCC employs lockstep processing and includes first and second programmable logic devices (PLDs).

17. The control system of claim 15, wherein the control system employs a command/command (COM/COM) architecture, wherein at least one of the actuators includes an actuation controller having first, second, and third PLDs, wherein the third PLD is configured to receive and perform a summing of trapezoidal commutation Pulse Width Modulation (PWM) voltage commands from the first and second PLDs, and wherein the third PLD is further configured to send back to the first and second PLDs one or more average PWM commands.

18. The control system of claim 15 wherein:

during a direct mode of operation, a plurality of inceptor signals generated by the inceptors are communicated directly by the linkages from the inceptors to the actuators; and during a normal mode of operation, a plurality of control signals generated by the at least one FCC are communicated by the at least one CAN bus to the plurality of actuators.

19. The control system of claim 18, wherein the at least one CAN bus includes a first CAN bus and a second CAN bus, and the at least one FCC includes a first FCC and a second FCC.

20. A method of operating an aircraft by a fly-by-wire (FBW) control system of the aircraft, the method comprising:

providing the aircraft with the FBW control system, wherein the FBW control system includes a plurality of inceptors, a plurality of actuators, a plurality of first linkages, at least one flight control computer (FCC), and at least one additional linkage;

wherein each of the inceptors is electrically coupled to a respective one or more of the actuators by a respective one or more of the first linkages, so that each of the first linkages respectively electrically couples a respective pair of the inceptors and actuators, and wherein the at least one FCC is coupled only indirectly to one or more of the inceptors, by each of the at least one additional linkage, at least one of the first linkages, and at least one of the actuators;

switching from a normal mode of operation to a direct mode of operation, wherein, during the normal mode of operation, a first one of the actuators is controlled at least in part based upon control signals provided by the at least one FCC; and wherein, during the direct mode of operation, the first one of the actuators is controlled exclusively based upon one or more of a plurality of inceptor signals generated by the inceptors that is or are communicated directly by one or more of the first linkages to the first one of the actuators.

* * * * *